(12) United States Patent
Patel (10) Patent No.: US 10,371,935 B1
(45) Date of Patent: Aug. 6, 2019

(54) UNMANNED AERIAL VEHICLE BEAM REDIRECTION SYSTEM AND METHOD

(71) Applicant: THE BOEING COMPANY, Chicago, IL (US)

(72) Inventor: Mitesh Patel, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/940,157

(22) Filed: Mar. 29, 2018

(51) Int. Cl.
| | | |
|---|---|---|
| G02B 23/04 | (2006.01) | |
| G11B 7/1395 | (2012.01) | |
| B64C 39/02 | (2006.01) | |
| G02B 27/14 | (2006.01) | |
| G11B 7/1362 | (2012.01) | |

(52) U.S. Cl.
CPC ............ *G02B 23/04* (2013.01); *B64C 39/024* (2013.01); *G02B 27/148* (2013.01); *G11B 7/1362* (2013.01); *G11B 7/1395* (2013.01)

(58) Field of Classification Search
CPC .... G02B 23/04; G02B 27/148; B64C 39/024; G11B 7/1362; G11B 7/1395
USPC .......................................................... 356/254
See application file for complete search history.

(56) References Cited

U.S. PATENT DOCUMENTS

| | | | |
|---|---|---|---|
| 2008/0245930 A1 | 10/2008 | Nayfeh et al. | |
| 2010/0116886 A1* | 5/2010 | Flowers | F41G 7/008 235/404 |
| 2017/0259183 A1* | 9/2017 | Matloff | A63H 27/12 |
| 2019/0077519 A1* | 3/2019 | Husain | B64F 1/222 |

* cited by examiner

*Primary Examiner* — Hina F Ayub
(74) *Attorney, Agent, or Firm* — Philip S. Hof; The Small Patent Law Group, LLC (57) ABSTRACT

An unmanned aerial vehicle (UAV), a beam redirection system, and a method for redirecting a laser beam using one or more UAVs are provided. The UAV includes a housing, a beam deflector, and a vehicle controller. The beam deflector is mounted to the housing. The vehicle controller is configured to control an angular orientation of the beam deflector to redirect a laser beam that is received from an off-board laser source.

22 Claims, 5 Drawing Sheets

UNMANNED AERIAL VEHICLE BEAM REDIRECTION SYSTEM AND METHOD

FIELD

Embodiments of the present disclosure generally relate to systems and methods for redirecting beams using unmanned aerial vehicles (UAVs).

BACKGROUND

Unmanned aerial vehicles (UAVs), such as drones, are used in various applications, such as monitor locations. For example, drones may be deployed to monitor an area from high above, giving a bird's eye view of the area, and drones may also be deployed into confined areas, such as buildings, for reconnaissance missions, surveying, and the like. Typically, a drone includes one or more propulsion systems, such as one or more motors having propeller blades attached thereto, for providing thrust to maintain flight and move to different locations.

Some drones, such as relatively small drones, may not be usable in certain applications because the drones are not able to carry certain devices onboard, such as sensors, laser emitters, cameras, audio devices, etc. The drones may not be able to carry the devices due to limited available space onboard and/or due to limited power capability of the propulsion system, which restricts the weight of the drone's payload. For example, even if a given drone is able to accommodate an extra laser emitting device onboard, the additional weight may significantly diminish the energy efficiency of the drone, reducing the flight duration before additional energy (e.g., a substituted or recharged battery) is required. Larger drones with greater power capabilities may be able to carry more devices, but these larger drones may not be able to navigate within confined spaces, which limits the applicability of the larger drones for certain tasks. The larger drones may also have greater costs and greater energy consumption than the smaller drones.

SUMMARY

Certain embodiments of the present disclosure provide an unmanned aerial vehicle (UAV) that includes a housing, a beam deflector, and a vehicle controller. The beam deflector is mounted to the housing. The vehicle controller is configured to control an angular orientation of the beam deflector to redirect a laser beam that is received from an off-board laser.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

A need exists for a system and method that increase the usefulness of UAVs for performing different types of tasks without increasing the size of the UAVs or reducing the energy efficiency of the UAVs.

With those needs in mind, certain embodiments of the present disclosure provide beam redirection system that utilizes one or more UAVs to redirect a laser beam received from a laser source that is off-board the one or more UAVs. The one or more UAVs may include a network of plural UAVs controlled to occupy different corresponding tactical positions within a working environment. The UAVs include respective beam deflectors that are angularly oriented to direct the laser beam from one UAV to a next UAV in a sequence along a designated path. The respective beam deflectors may redirect the laser beam by reflecting and/or refracting an incident laser beam in a direction towards a succeeding UAVs in the sequence. The designated path may extend into and/or through a confined area, such as a building, a cave, a bunker, or the like. The designated path may extend out of a line of sight of the off-board laser source that generated that laser beam. For example, at least some of the UAVs may occupy tactical positions that are behind obstructions relative to the off-board laser source, such as walls of buildings, trees, or the like. Each of the UAVs may function as a node in the network of UAVs. The laser beam may linearly propagate from the off-board laser source to a first UAV and from the first UAV to each successive UAV in the sequence. Due to the arrangement of the UAVs in the network, the overall path of the laser beam through the network (e.g., from the laser source to a final UAV in the sequence) may be non-linear.

In at least one embodiment, the laser beam may be redirected by the network of UAVs through the working environment to a target. The beam redirection system may be used for a variety of targets and applications. For example, the target may be at least a part of a room in a building, and the laser beam is redirected by the network of UAVs to the room for scanning, surveying, and/or imaging the room. Instead of scanning the room, the network of UAVs may alternatively use the laser beam to project information within the room, such as for providing celestial-like navigation for one or more local objects within the room. The target in another example may be a photodetector device, and the laser beam that is redirected by the network of UAVs may encode information that is communicated to the photodetector device via the laser beam. The optical transmission of information, via the network of UAVs, may be useful in certain situations when radio-frequency communication is not available. In another example, the target may be a suspect or a suspicious object, and the network of UAVs may redirect the laser beam to incapacitate the suspect and/or destroy the suspicious object without risking harm to military persons or first responders. In still another example, the target may be a photovoltaic cell, and the laser beam is redirected by the network of UAVs to impinge upon the photovoltaic cell for converting the light energy (e.g., photons) of the laser beam to electrical energy. The electrical energy may be used to charge a battery, such as but not limited to a battery of a propulsion system on one of the UAVs. Although several example applications are described, the beam redirection system according to the embodiments described herein may be used in various other applications to redirect a laser beam along a non-linear path or course to a target.

A technical effect of one or more of the embodiments described herein is that the hardware that generates and emits the laser beam may be off-board the UAVs of the network, allowing the UAVs to be smaller and more energy efficient than the UAVs would be in order to support onboard laser-generating hardware. Another technical effect of the embodiments described herein is the ability to supply a laser beam to a target without requiring a human or the laser source device to be proximate to the target, which may increase safety and/or reduce costs. For example, the people and laser source may remain outside of a building in a safe area while the UAVs occupy tactical positions within the building to redirect the laser beam to a target within the building. Yet another technical effect of the embodiments described herein is that the network of UAVs can be used to redirect various different types of laser beam to various different targets without modifying the UAVs. For example, the beam deflectors of the UAVs may be used to redirect laser beams of various energy levels, laser beams with or without embedded information, and the like.

Figure 1:
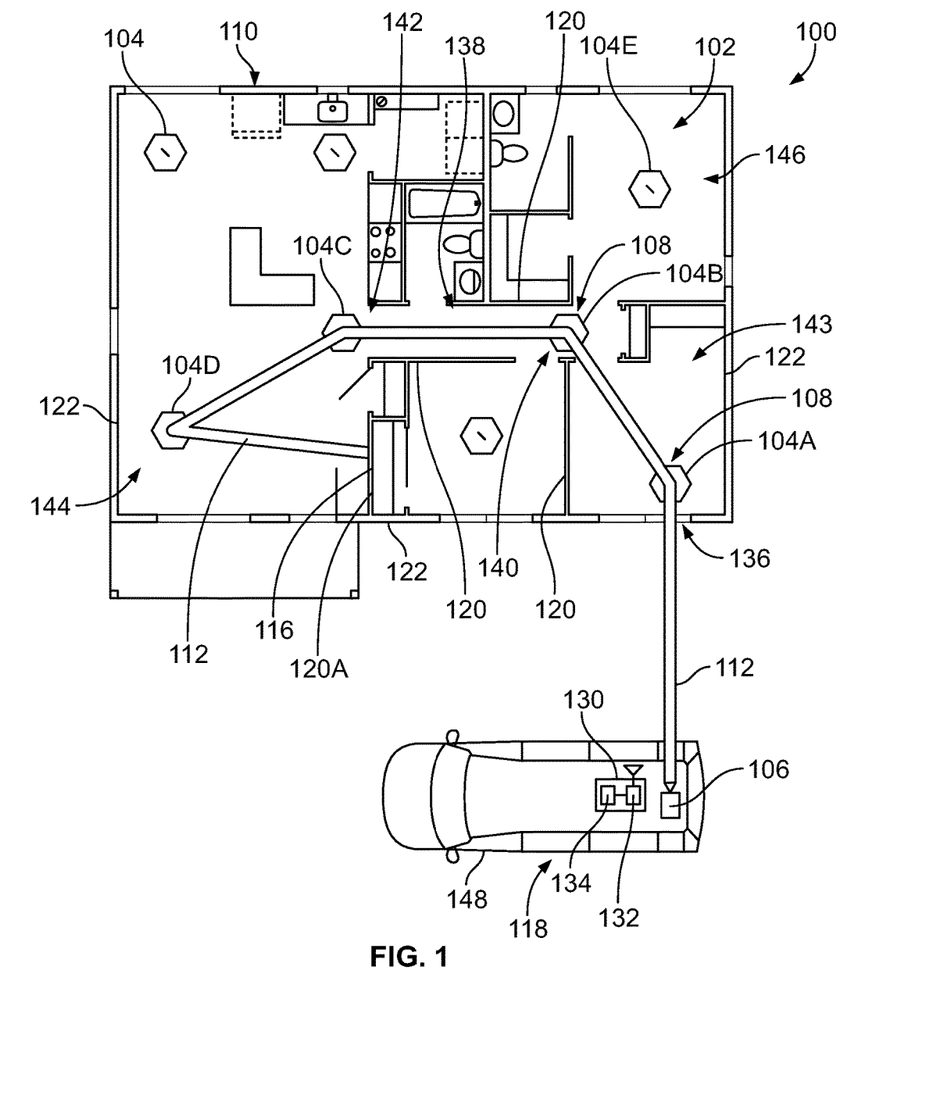
FIG. 1 illustrates a plan view of a beam redirection system, according to an embodiment of the present disclosure.

FIG. 1 illustrates a plan view of a beam redirection system 100 according to an embodiment of the present disclosure. The beam redirection system 100 includes a network 102 of multiple unmanned aerial vehicles (UAVs) 104 (or drones). The beam redirection system 100 also includes a laser source 106. The laser source 106 generates and emits a beam of light (e.g., photons) 112. The beam of light 112 may be generated using a process of optical amplification based on the stimulated emission of electromagnetic radiation. The beam of light 112 is referred to herein as a "laser beam", regardless of the beam characteristics (e.g., intensity, wavelength, frequency, etc.).

The network 102 of UAVs 104 redirects the laser beam 112 emitted from the laser source 106 along a non-linear path to a target 116. For example, the UAVs 104 represent nodes of the network 102 that redirect (e.g., reflect and/or refract) the laser beam 112 between the corresponding UAVs 104 to a given target 116. The laser beam 112 performs a task on or with the target 116, such as by scanning, measuring, surveying, detonating, incapacitating, destroying, etc. the target 116, transmitting information to the target 116, displaying information on the target 116, or the like. In at least one embodiment disclosed herein, the UAVs 104 do not independently generate laser beams based on the laser beam 112 received. For example, the UAVs 104 optionally may not include laser emitting devices disposed onboard. Rather, the UAVs 104 include beam deflectors 202 (shown in FIG. 2) that redirect the laser beam 112 via refraction and/or reflection, such that a beam received by a given UAV 104 is the same beam that exits the UAV 104. The same laser beam 112 emitted by the laser source 106 may be received at each of the UAVs 104 in the travel path to the target 116, which may or may not include all of the UAVs 104 in the network 102.

In at least one embodiment, the laser source 106 is located off-board the UAVs 104. For example, the network 102 of UAVs 104 are located in a working environment 110 in which the UAVs utilize the laser beam 112 to perform the task. In the illustrated environment the working environment 110 is a building, such as a house, apartment, office building, retail store, or the like. In an alternative embodiment, the network 102 of UAVs 104 may be disposed within a working environment that is outside of a building, such as a wooded area, a suburb, a downtown area of a city or town, or the like. The laser source 106 may be remote from the working environment 110, located within a staging area 118. In the illustrated embodiment the staging area 118 includes or represents a vehicle 148, such as a van or truck, but the staging area 118 may be an area along the ground or within another building an alternative embodiment. If the working environment 110 poses a safety risk due to a suspicious person or object within, due to a potential structural collapse, due to difficulty in accessing and/or traversing through the working environment 110, or the like, then the staging area 118 may be spaced apart from the working environment 110 by a designated safe distance (which may be based on the severity of the threat). In an alternative embodiment, the staging area 118 may be a significant distance (e.g., at least 50 meters (m) or at least 100 m) from the working environment 110. The distance may be over the horizon, such that the curvature of the earth obstructs a direct line of sight between the laser source 106 and the UAVs 104. For example, the laser source 106 may be disposed on a marine vessel, and the UAVs 104 can be controlled to fly over the ocean a significant distance from the marine vessel.

The UAVs 104 in the network 102 are coordinated to be in specific locations and specific angular orientations relative to the laser source 106, the target 116, and to obstructions within the working environment 110 to allow the UAVs 104 to relay the laser beam 112 from the laser source 106 to the target 116 without striking any obstructions. For example, the target 116 may be out of the line of sight of the laser source 106 due to one or more obstructions within the working environment 110 that prevent the laser source 106 from emitting the laser beam 112 in a direct, linear trajectory to the target 116. The UAVs 104 function as portable optical directors that redirect the laser beam 112 around the obstructions along a non-linear path. Although the overall path from the laser source 106 to the target 116 is non-linear, it is recognized that the non-linear path is defined by multiple linear segments from the laser source 106 along one or more of the UAVs 104 and finally to the target 116.

The building that represents the working environment 110 in FIG. 1 includes various walls that define obstructions, including both interior walls 120 and exterior walls 122. The interior walls 120 separate rooms in the building. The exterior walls 122 define a perimeter of the building. The laser source 106 is outside of the building in the staging area 118. The target 116 is within the building and is obstructed from the laser source 106 via one or more of the walls 120, 122.

The UAVs 104 in the network 102 are controlled to fly to different, coordinated tactical positions 108 within the working environment 110. The tactical positions 108 may be based on the locations of obstructions in the working environment and the location of the target 116. For example, when the working environment 110 is a building as shown in FIG. 1, at least some of the tactical positions 108 occupied by the UAVs 104 may be entrance and exit locations of various rooms, hallways, and other spaces of the building. The UAVs 104 are controlled to fly to different corresponding tactical positions 108, such that the UAVs 104 are spaced apart from each other. The characteristics of the tactical positions, such as coordinates, elevations from ground level, distances from reference points, and the like, may be determined based on a map of the working environment 110.

At the tactical positions 108, the UAVs 104 may be controlled to remain relatively stationary and hover in place relative to the working environment 110. The elevation or altitude of the UAVs 104 from the ground level and the angular orientations of the UAVs may be controlled in order to relay the laser beam 112 along a path to the target 116.

In the illustrated embodiment, the tactical position 108 of a first UAV 104A in the network 102 is located proximate to an ingress or entryway 136 into the building, such as a doorway or a window. The first UAV 104A is within a line of sight of the laser source 106, and the first UAV 104A received the laser beam 112 directly from the laser source 106. The tactical position 108 of a second UAV 104B in the network 102 is in a line of sight of the first UAV 104A. The second UAV 104B is located at a first end 140 of a hallway 138, proximate to the room 143 occupied by the first UAV 104A. The first UAV 104A is configured to redirect the laser beam 112 received from the laser source 106 towards the second UAV 104B by changing an angle of the beam trajectory. The tactical position 108 of a third UAV 104C is at an opposite, second end 142 of the hallway 138 relative to the second UAV 104B, such that the third UAV 104C is within a line of sight of the second UAV 104B. It is noted that the third UAV 104C is not within a line of sight of the first UAV 104A or the laser source 106 due to obstructing interior and exterior walls 120, 122. The second UAV 104B redirects the laser beam 112 received from the first UAV 104A towards the third UAV 104C. The tactical position 108 of a fourth UAV 104D in the network 102 is within a room 144 open to the second end 142 of the hallway 138, such that the fourth UAV 104D is within a line of sight of the third UAV 104C. The third UAV 104C redirects the laser beam 112 received from the second UAV 104B towards the fourth UAV 104D. The fourth UAV 104D redirects the laser beam 112 received from the third UAV 104C to the target 116. In the illustrated embodiment, the target 116 is an interior wall 120A within the room 144 occupied by the fourth UAV 104D.

The laser beam 112 may be redirected onto the interior wall 120A for various reasons associated with different assigned tasks. For example, the task may be to image, scan, or survey the room 144 to generate a 3D point cloud map of the room 144. The laser beam 112 may be used for measuring dimensions of the interior wall 120A and/or the entire room 144, such as a LIDAR or other range-finding laser system. In another example task, the laser beam 112 may be directed onto the interior wall 120A to project graphics and/or information on the wall 120A. For example, information projected onto the wall may be used, like celestial navigation, by one or more objects or persons within the room 144.

In yet another example task, photodetector (not shown) may be mounted on or proximate to the wall 120A, and the photodetector is configured to receive the laser beam 112 and detect or extract encoded information that is embedded within the laser beam 112. For example, the laser beam 112 may be used to communicate optically between the staging area 118 and the room 144 within the working environment 110, which may be useful when other means of communication (e.g., radio frequency (RF)) are not available. The encoded information within the laser beam 112 may modulated as a series of pulses in the laser beam 112, may be conveyed along specific wavelengths of light in the laser beam 112, or the like. The photodetector within the room 144 may be positioned and oriented to monitor the laser beam 112, and is designed to convert light energy to electrical energy. The photodetector may be or include a photodiode, a phototransistor, a photocell, or the like. The photodetector may detect the encoded information within the laser beam 112, and convey the information as electrical signals (e.g., current) for processing the signals and/or converting the electrical signals to sounds. For example, the photodetector may be operatively connected to an audio speaker that is configured to receive the electrical signals and generate an alarm or other audible message.

In another example task, the laser beam 112 may be a relatively high energy beam that is configured to penetrate through the interior wall 120A (e.g., to provide an escape route, an air conduit, or the like), incapacitate a suspect, detonate or otherwise damage a suspicious object, or the like. The examples above are not intended to be an exhaustive list of potential tasks that can be performed by redirecting a laser beam to a target, as various other types of tasks are possible.

In the illustrated embodiment, several of the UAVs 104 in the network 102 are located at tactical positions 108 within the working environment 110 that are spaced apart from the travel path of the laser beam 112 and do not receive the laser beam 112. For some tasks the target 116 may change or move, and the tactical positions 108 of these UAVs 104 may allow for directing the laser beam 112 to other areas of the working environment 110. In the illustrated embodiment, all of the UAVs 104 in the network 102 are located at corresponding tactical positions 108 that are in a line of sight of at least one other UAV 104. For example, a fifth UAV 104E is disposed within a back room 146 in a line of sight of the second UAV 104B. If the target 116 is designated as within the back room 146, then the second UAV 104B may modify its angular position in order to redirect the laser beam 112 received from the first UAV 104A towards the fifth UAV 104E instead of towards the third UAV 104C. Optionally, the second UAV 104B may be configured to split the laser beam 112 such that a first portion of the laser beam 112 is redirected towards the third UAV 104C and a second portion of the laser beam 112 is redirected towards the fifth UAV 104E.

Although the laser beam 112 in the illustrated embodiment is redirected along a designated path that utilizes four of the UAVs 104 in the network 102 as nodes, it is recognized that more or less UAVs 104 may be utilized to direct the laser beam 112 to different targets within the working environment 110. In the simplest example, the first UAV 104A that receives the laser beam 112 directly from the laser source 106 may redirect the laser beam 112 towards a target without redirecting the laser beam 112 to the second UAV 104B. In such an example, the target may be one or more of the walls 120, 122 of the room 143 occupied by the first UAV 104A, or the like.

Optionally, the target may change over time depending on the type of task. For a scanning or surveying task, such as to generate a 3D point cloud of the building, a first target may be the room 143, such that the first UAV 104A redirects the laser beam 112 onto the walls 120, 122 of the room 143 to measure dimensions and distances of the room 143. After scanning the room 143, the first UAV 104A may be controlled to change the angular orientation such that the laser beam 112 is redirected from the first UAV 104A to the second UAV 104B. The second UAV 104B may be controlled to redirect the laser beam 112 to the interior walls 120 of the hallway 138 to scan the hallway 138, redirect the laser beam 112 to the fifth UAV 104E for scanning the back room 146, and/or redirect the laser beam 112 to the third UAV 104C for scanning other rooms of the building.

In at least one embodiment, the beam redirection system 100 includes a remote control system 130. The remote control system 130 is off-board the UAVs 104. In the illustrated embodiment, the remote control system 130 is disposed within the staging area 118 proximate to the laser source 106, but the remote control system 130 may be located closer to the working environment 110 or farther away from the working environment 110 than the staging area 118 in an alternative embodiment. The remote control system 130 may be configured to control the locations of the UAVs 104 by selecting the tactical positions 108 for the UAVs 104. The remote control system 130 may also be configured to control movement of the UAVs 104, such as translational movement (e.g., side-to-side and/or up-and-down) and angular rotation, in order for each UAV 104 to be able to receive the laser beam 112 and redirect the laser beam 112 in an appropriate direction.

The remote control system 130 may include a communication device 132 and a control unit 134 having one or more processors. The remote control system 130 optionally includes additional features, such as a memory, a user input/output device, and the like, that are not shown in FIG. 1. The remote control system 130 is configured to communicate wirelessly with the network 102 of UAVs 104. For example, the control unit 134 may control the communication device 132 to transmit or broadcast control signals (e.g., messages) to one or more of the UAVs 104. The communication device 132 optionally may transmit the control signals via a communication link according to a known communication protocol, such as Bluetooth®, Wi-Fi, or the like. The control unit 134 may generate and/or select the control signals and the intended recipients of the control signals. The control signals may designate propulsion settings (e.g., speed, thrust forces, etc.), orientation settings, location settings (e.g., GPS coordinates), or the like.

The remote control system 130 may also control the operation of the laser source 106. For example, the control unit 134 may be operatively connected to the laser source 106. The control unit 134 may control the generation of the laser beams 112 by the laser source 106 (e.g., via communication over a wired or wireless connection), such as the timing, intensity, and/or other characteristics of the laser beams 112. In at least one embodiment, the control unit 134 may encode or embed the control signals for the UAVs 104 within the laser beams 112 emitted by the laser source 106. For example, instead of (or in addition to) transmitting or broadcasting the control signals (that designate various actions or positions for the UAVs 104) via an RF communication link, the control signals may be encoded within the laser beams 112 and optically transmitted to the UAVs 104. The information (e.g., control signals) may be modulated as a series of pulses of the laser beam 112, may be conveyed along specific wavelengths and/or frequencies of light within the beam 112, or the like.

In at least one embodiment, the UAVs 104 include photodetectors 550 (shown in FIG. 6) disposed onboard the UAVs 104 for receiving and interpreting the information embedded within the laser beam 112. The beam redirection system 100 may utilize the laser beam 112 as the transmission medium for the control signals that control the relative positioning and orientation of the UAVs 104 in the network 102. The information embedded within the laser beam 112 may also include identification information associated with specific recipient UAVs 104, may identify a target or task, or the like. Optically communicating the control signals for the UAVs 104 and/or other information via the laser beam 112 may be useful when RF communication is not available or compromised.

In an alternative embodiment, the locations and orientations of the various UAVs 104 in the network 102 are controlled locally by one or more vehicle controllers 204 (shown in FIG. 2) onboard the UAVs 104, instead of by the remote control system 130. The beam redirection system 100 optionally does not include the remote control system 130 in such an alternative embodiment.

Figure 2:
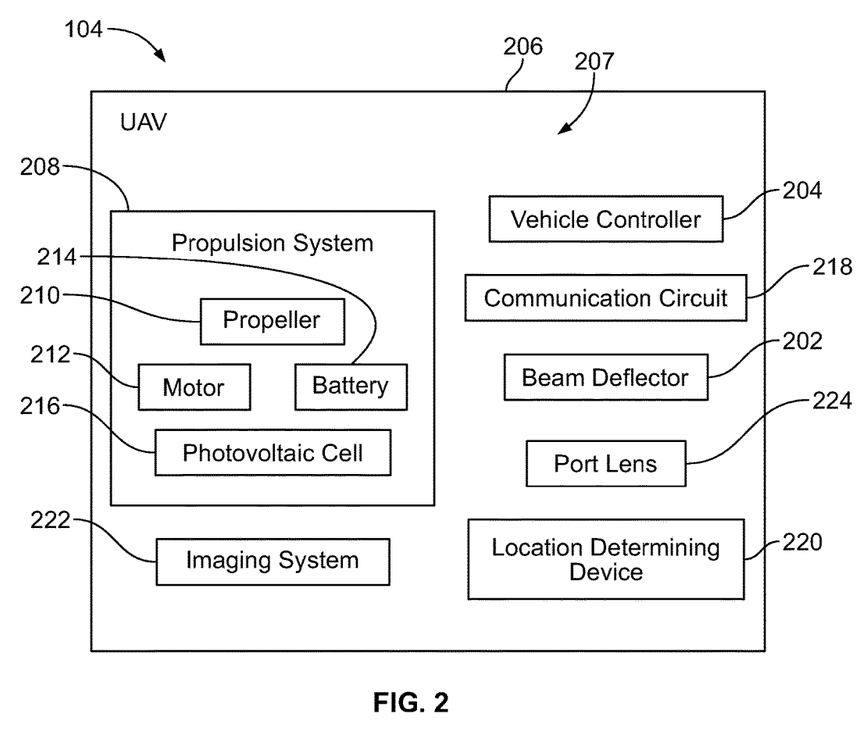
FIG. 2 illustrates a simplified schematic diagram of one of the UAVs (or drones) of the beam redirection system, according to an embodiment of the present disclosure.

FIG. 2 illustrates a simplified schematic diagram of one of the UAVs (or drones) 104 of the beam redirection system 100 according to an embodiment of the present disclosure. The UAV 104 includes a housing 206, a propulsion system 208, a beam deflector 202, and a vehicle controller 204. The propulsion system 208 is mechanically coupled to the housing 206, and is configured to generate lift to enable and maintain flight of the UAV 104. The beam deflector 202 is mounted to the housing 206. The beam deflector 202 is the device or component that redirects the laser beam received from an off-board laser source (e.g., the laser beam 112 shown in FIG. 1). For example, a laser beam that impinges upon the beam deflector 202 is reflected and/or refracted by the beam deflector 202 at an angle (e.g., a redirection angle) different than the incident angle of the laser beam. The vehicle controller 204 controls one or more operations of the UAV 104. For example, the vehicle controller 204 may represent or include one or more processors that are configured to control operation of the component(s) of the UAV 104. The vehicle controller 204 controls an angular orientation of the beam deflector 202 in order to control the redirection angle of the laser beam for guiding the laser beam towards another UAV 104 in the network 102 (FIG. 1) or towards the target.

The propulsion system 208 may include one or more propellers 210 coupled to one or more motors 212 that exert torque on the one or more propellers 210. The propellers 210 may include or represent one or more rotors or the like. The motor 212 may include or represent an electrical motor, an engine, or the like. The propulsion system 208 may include at least one battery 214 that provides a power source for the motor 212 to exert the torque on the propellers 210. The battery 214 may be a lithium ion battery or the like. The battery 214 may be rechargeable. For example, the battery 214 may be coupled to a photovoltaic cell 216 that converts electromagnetic radiation, such as solar energy, into electrical energy. The battery 214 may receive and store the electrical energy generated by the photovoltaic cell 216. Although shown as two different components in FIG. 2, the battery 214 and the photovoltaic cell 216 may be joined to define a unitary energy storage device. Optionally, the battery 214 may be recharged through thermal energy or wind energy instead of, or in addition to, the photovoltaic cell 216.

The vehicle controller 204 is operatively connected to the propulsion system 208, and is configured to control operation of the propulsion system 208. For example, the vehicle controller 204 may generate control signals that designate settings or operations to control movement and positioning of the UAV 104. The control signals may independently control the rotational speed of each of the propellers 210 by adjusting the outputs of the motors 212. The rotational speeds of the propellers 210 may be controlled in order to steer movement of the UAV 104, maintain flight of the UAV 104, and to change an angular orientation of the overall UAV 104. For example, the settings may include increasing or decreasing a speed of a designated propeller 210 to move the UAV 104 in a designated direction.

The UAV 104 may also include a communication circuit or device 218 that is operatively connected to the vehicle controller 204 through one or more wired or wireless connections. The vehicle controller 204 controls operation of the communication circuit 218. The communication circuit 218 may include or represent one or more antennas, one or more transceivers (or discrete transmitters and receivers), and associated circuitry. The communication circuit 218 may be configured to receive wireless messages from remote communication sources, such as other UAVs 104 in the network 102 or from the remote control system 130 (shown in FIG. 1), and forward the received information to the vehicle controller 204 for processing. For example, the communication circuit 218 may receive off-board control signals from the remote control system 130 and/or another UAV 104. The off-board control signals may indicate a tactical position for the UAV 104 to occupy and/or an angular orientation of the beam deflector 202. The vehicle controller 204 may adjust the position of the UAV 104 (e.g., via the propulsion system 208) and/or the angular orientation of the beam deflector 202 responsive to receiving an off-board control signal. The communication circuit 218 may also be configured to transmit or broadcast control signals or messages generated by the vehicle controller 204 to remote recipients, such as other UAVs 104 or the remote control system 130.

The UAV 104 may also include a location determining device 220, which may be in communication with the vehicle controller 204 through one or more wired or wireless connections. The vehicle controller 204 may be configured to control operation of the location determining device 220. The location determining device 220 may be configured to measure or determine position data associated with the UAV 104. The location determining device 220 may be a global positioning system (GPS), such that the position data is global positioning coordinates of the location determining device 220. Alternatively, the location determining device 220 may include an inertial navigation system (e.g., a gyroscope), a LIDAR system, ultrasound-based system, or another location device other than a GPS device to determine a location of the UAV 104. Optionally, the UAV 104 may not include the location determining device 220. For example, the UAV 104 may be able to determine its position relative to other UAVs 104 in the network 102 via trilateration with other UAVs 104 or similar algorithms.

The UAV 104 may include at least one port lens 224 mounted to the housing 206. The port lens 224 may receive either the incident laser beam (e.g., prior to impinging upon the beam deflector 202) or the redirected laser beam (e.g., after impinging upon the beam deflector 202). The port lens 224 may be configured to affect the laser beam, such as by stabilizing, concentrating, collimating, expanding, or redirecting the laser beam. The port lens 224 may be electronically controllable to steer the laser beam to the beam deflector 202. For example, an incoming beam may not align with a body axis of the UAV 104. In this case, the port lens 224 redirects the laser beam to substantially align with the body axis such that the laser beam can be directed to the beam deflector 202. Optionally, the UAV 104 may not include the at least one port lens 224.

Optionally, the UAV 104 includes an imaging system 222, which may be in communication with the vehicle controller 204 through one or more wired or wireless connections. The vehicle controller 204 may be configured to control operation of the imaging system 222. The imaging system 222 may include one or more cameras, thermal imaging devices, infrared imaging devices, ultrasonic imaging devices, and/or the like. Optionally, the UAV 104 may not include the imaging system 222.

The housing 206 defines an internal cavity 207. At least some of the components of the UAV 104 may be held within the internal cavity 207. In at least one embodiment, the internal cavity 207 houses at least the propulsion system 208 (including the propellers 210), the vehicle controller 204, the beam deflector 202, the communication circuit 218, and the location determining device 220. The components within the housing 206 may be protected from impact forces and less prone to damage. This arrangement also allows for stacking multiple UAVs 104, such as when not in flight (e.g., in storage). The housing 206 may include a plurality of air holes along top and bottom sides thereof to allow air flow through the internal cavity 207. In an alternative embodiment, at least some other components may be coupled to the housing 206 outside of the internal cavity 207, such as the propellers 210 which may extend above a top of the housing 206.

The UAV 104 may include more components, less components, or at least some different components than shown, depending on a particular mission of the UAV 104. It is to be understood that the components in FIG. 2 are diagrammatic boxes that do not reflect size or shape or relative positions of the components.

Figure 3:
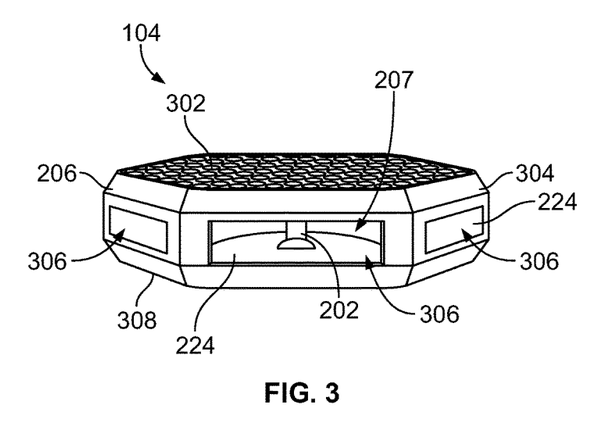
FIG. 3 is a perspective view of one of the UAVs of the beam redirection system, according to an embodiment of the present disclosure.

FIG. 3 is a perspective view of one of the UAVs (or drones) 104 of the beam redirection system 100 according to an embodiment of the present disclosure. The UAV 104 in the illustrated embodiment includes four propellers 210 held within the housing 206. The beam deflector 202 is mounted within the internal cavity 207 of the housing 206. The housing 206 defines multiple ports 306 along a perimeter of the housing 206. The ports 306 provide access to the beam deflector 202 within the internal cavity 207. For example, the beam deflector 202 receives a laser beam through one of the ports 306. The beam deflector 202 redirects the laser beam to exit the internal cavity 207 through the same or a different one of the ports 306. The ports 306 in the illustrated embodiment are spaced apart circumferentially along one or more perimeter walls 304 of the housing 206. The one or more perimeter walls 304 extend from the top side 302 to a bottom side 308 of the housing 206 that is opposite the top side 302. The port lenses 224 may be mounted to the housing 206 within the ports 306. For example, the port lenses 224 may substantially fill the area of the ports 306 such that the laser beam enters and exits the internal cavity 207 via refraction through one or more of the port lenses 224. The port lenses 224 in an embodiment may be gyroscopically-controlled by the vehicle controller 204 within the respective ports 306. For example, the vehicle controller 204 may adjust an orientation of the port lenses 224 to change a plane in which the laser beam 112 is emitted from the UAV 104 towards another UAV or a target. Adjusting the port lenses 224 may enable directing the laser beam out of a lateral body plane defined by the housing 206, which may be useful for redirecting the laser beam to a second floor of a building, towards a ceiling, or the like. In an alternative embodiment, the UAV 104 may not include the port lenses 224, and the ports 306 may be open.

Figure 4:
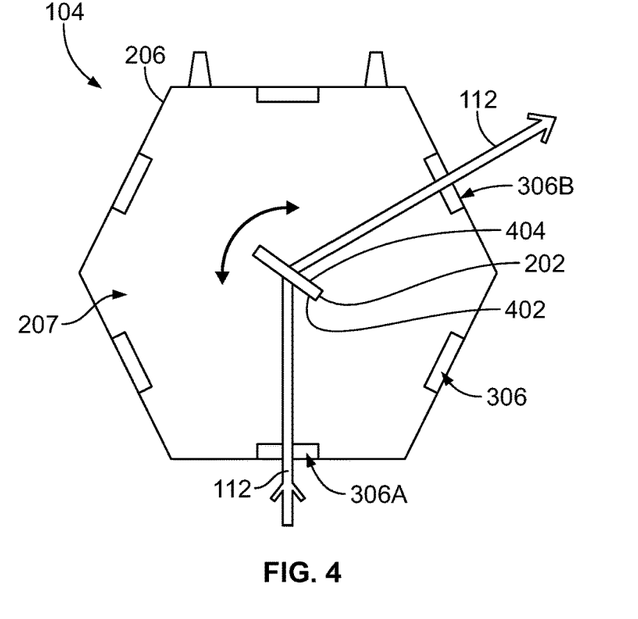
FIG. 4 is a top-down schematic view of the UAV shown in FIG. 3.

FIG. 4 is a top-down schematic view of the UAV 104 shown in FIG. 3. The beam deflector 202 is centrally mounted within the internal cavity 207 of the housing 206. The beam deflector 202 may be or include a mirror, lens, beam splitter, or the like. The beam deflector 202 has a linear cross-sectional shape with a first surface 402 and a second surface 404 in the illustrated embodiment, but the beam deflector 202 may have a different cross-sectional shape in other embodiments, such as triangular, square, or the like. The beam deflector 202 is configured to reflect the laser beam 112 and/or refract the laser beam 112. In the illustrated embodiment, the laser beam 112 impinges upon the first surface 402, which is transparent or at least translucent such that the beam 112 refracts internally into the beam deflector 202. The beam 112 is emitted from the beam deflector 202 along the second surface 404.

The beam deflector 202 may be pivotable along one or more axes relative to the housing 206. For example, the vehicle controller 204 (FIG. 2) may be configured to rotate the beam deflector 202 clockwise and/or counterclockwise along a vertical axis of the UAV 104 that in the illustrated orientation extends out of the page to change the angular orientation of the beam deflector 202. The vehicle controller 204 may rotate the beam deflector 202 via one or more gears. The housing 206 in the illustrated embodiment include six ports 306 along the perimeter of the housing 206. The laser beam 112 is received into the internal cavity 207 through a first port 306A, and the beam deflector 202 redirects (e.g., refracts) the laser beam 112 out of the internal cavity 207 through a different, second port 306B. By adjusting the angular orientation of the beam deflector 202 relative to the incident laser beam, the redirected laser beam may exit through a different one of the ports 306. In an alternative embodiment, the beam deflector 202 may be immovably fixed in one orientation relative to the housing 206, and the vehicle controller 204 may adjust the angle of the redirected laser beam relative to the incident beam by controlling the propulsion system 208 to commonly rotate both the housing 206 and the beam deflector 202.

Figure 5:
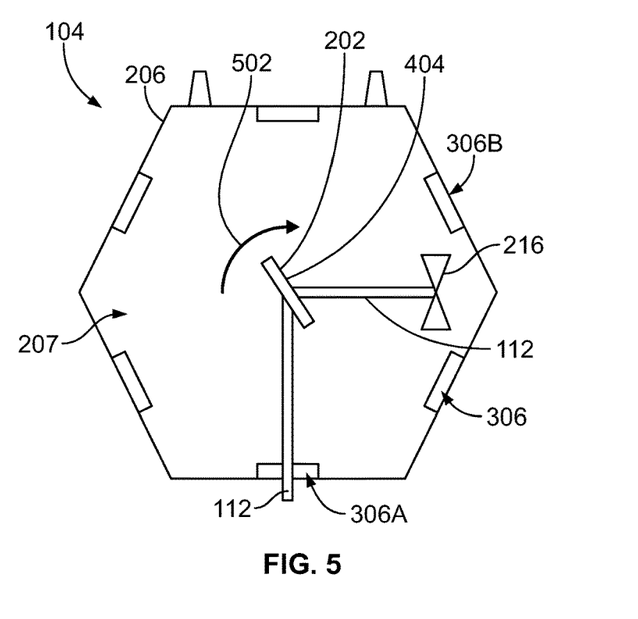
FIG. 5 is a top-down schematic view of the UAV showing a beam deflector in a different angular orientation relative to the orientation shown in FIG. 4.

FIG. 5 is a top-down schematic view of the UAV 104 with the beam deflector 202 in a different angular orientation relative to the orientation shown in FIG. 4. In at least one embodiment, the laser beam 112 may be used to generate electrical energy by redirecting the laser beam 112 towards the photovoltaic cell 216 of the UAV 104. The photovoltaic cell 216 may be within the internal cavity 207 between two ports 306. The photovoltaic cell 216 may represent a target in a task to recharge the battery 214 (FIG. 2) of the UAV 104. From the angular orientation of the beam deflector 202 in FIG. 4, the vehicle controller 204 (FIG. 2) may rotate the beam deflector 202 in a clockwise direction 502 such that the redirected laser beam 112 is emitted from the second surface 404 in a trajectory towards the photovoltaic cell 216 (instead of towards the port 306B). The photovoltaic cell 216 may convert the radiation energy of the laser beam 112 to electrical energy for charging the battery 214. Thus, the UAV 104 may be able to recharge mid-flight, extending the operation of the UAV 104. The task of recharging the battery 214 may be an ancillary task during the performance of another task.

Figure 6:
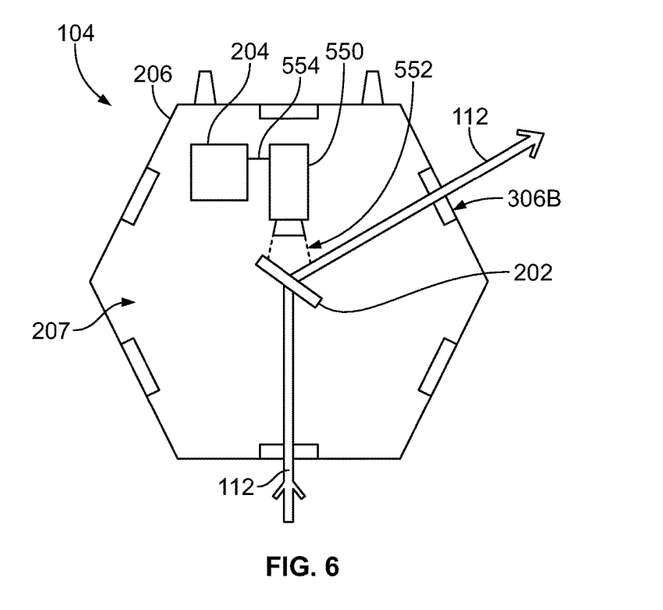
FIG. 6 is a top-down schematic view of the UAV showing a photodetector within the UAV according to an embodiment of the present disclosure.

FIG. 6 is a top-down schematic view of the UAV 104 showing a photodetector 550 within the UAV 104 according to an embodiment. The photodetector 550 is mounted within the internal cavity 207 of the housing 206, and is positioned to monitor the laser beam 112. The photodetector 550 has a field of view 552 that encompasses the laser beam 112. For example, the photodetector 550 may be positioned to face towards the beam deflector 202, as shown in FIG. 6. The photodetector 550 may include or represent a photodiode, a phototransistor, a photocell, or other kind of photosensor that converts optical energy (e.g., photons) into electrical energy (e.g., current). The photodetector 550 is utilized to extract information, such as control signals and the like, from the laser beam 112 without disrupting the path of the laser beam 112. For example, the photodetector 550 may monitor the laser beam 112 without disrupting the redirection of the laser beam 112 by the beam deflector 202 through the second port 306B. The photodetector 550 is operatively connected via a wired connection 554 to the vehicle controller 204; however the photodetector 550 may be wirelessly connected to the vehicle controller 204 in an alternative embodiment. The encoded information within the laser beam 112 is extracted by the photodetector 550 and converted to electrical signals, which are conveyed to the vehicle controller 204 for processing. For example, the encoded information may include control signals, and the vehicle controller 204 may modify the orientation of the beam deflector 202 and/or control the propulsion system 208 (FIG. 2) to move the UAV 104 in response to the control signals. Optionally, each of the UAVs 104 that receive the laser beam 112 may include photodetectors 550 that allow the UAVs 104 to extract the information from the laser beam 112. The information may identify specific recipient UAVs 104 such that the UAVs 104 are able to associate the control signals with the intended recipients.

Although not shown in FIG. 6, the beam deflector 202 optionally may be a beam splitter that splits the incident laser beam 112 into two deflected beams. The beam deflector 202 may direct (e.g., via reflection or refraction) one of the two beams towards the photodetector 550 to extract the embedded information, and the other beam remotely towards another UAV 104 or a target object.

Figure 7:
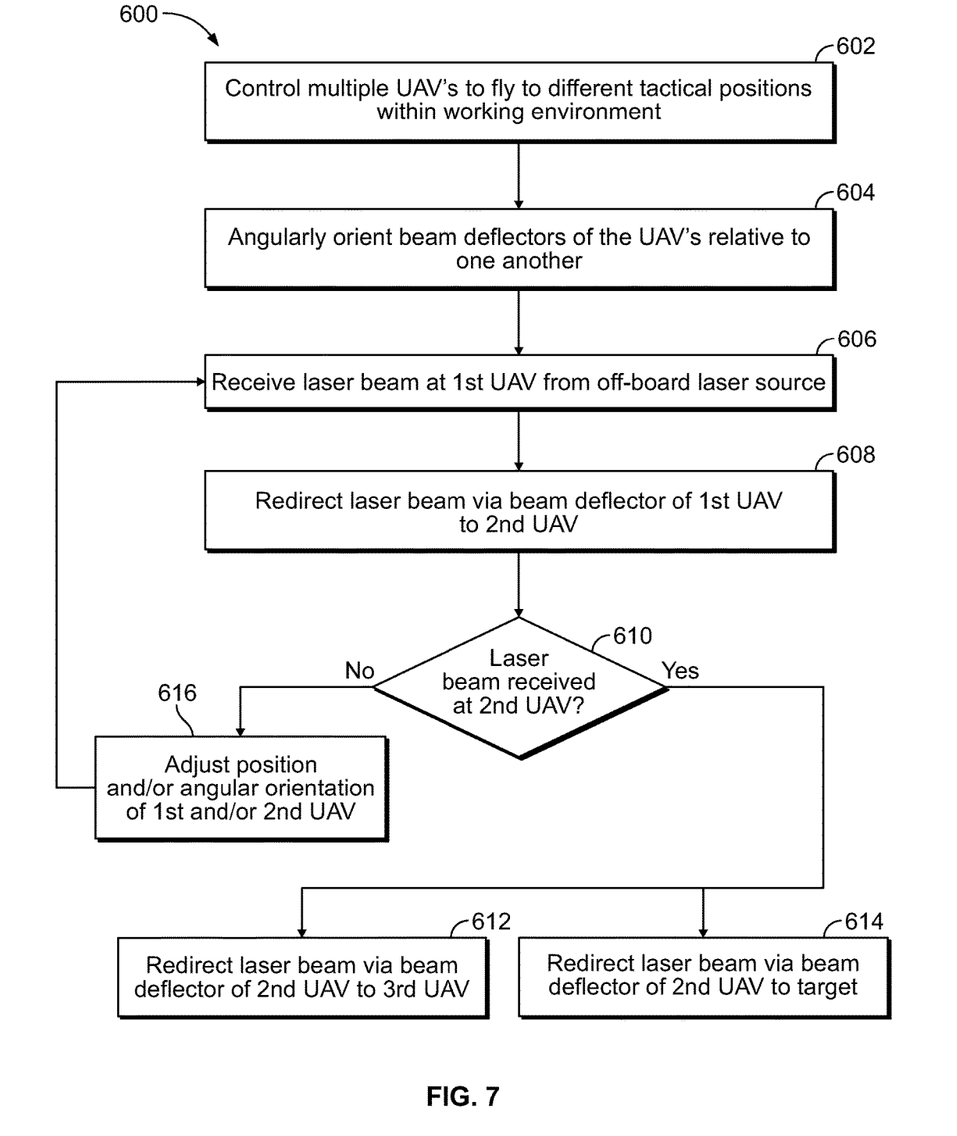
FIG. 7 illustrates a flow chart of a method for redirecting a laser beam using one or more UAVs, according to an embodiment of the present disclosure.

FIG. 7 illustrates a flow chart of a method 600 for redirecting a laser beam using one or more UAVs, according to an embodiment of the present disclosure. Referring to FIGS. 1-6, the method 600 begins at 602, at which multiple UAVs 104 are controlled to fly to different tactical positions 108 within a working environment 110. The tactical positions 108 may be designated such that each UAV 104 is within a line of sight to at least one other UAV 104, and at least one of the UAVs 104 is within a line of sight of an off-board laser source 106.

At 604, beam deflectors 202 of the UAVs 104 are angularly oriented relative to one another. The beam deflectors 202 may be angularly oriented via communications indicating where the UAVs 104 are located and indicating a designated path for a laser beam 112. For example, if the designated path for a laser beam is from the off-board laser source 106 through a first UAV 104 in a first room of a building to a second UAV 104 in an adjacent room, then the beam deflector 202 of the first UAV 104 may be angularly oriented relative to both the laser source 106 and the second UAV 104. The communications may be amount the UAVs 104 and/or between the UAVs 104 and a remote control system 130.

At 606, a laser beam 112 is received at a first UAV 104A from the off-board laser source 106. The laser beam 112 is received at the first UAV 104A such that the laser beam 112 impinges upon the beam deflector 202 of the first UAV 104A. At 608, the laser beam 112 is redirected, via the beam deflector 202 of the first UAV 104A, towards a second UAV 104B at a different tactical position 108.

At 610, it is determined whether or not the laser beam 112, redirected from the first UAV 104A, was received at the second UAV 104B. If the laser beam 112 was not received at the second UAV 104B, then the positioning and/or orientation of the first UAV 104A or the second UAV 104B may be in error. In such a case, flow proceeds to 616 and the position and/or angular orientation of one or more of the first and second UAVs 104A, 104B is adjusted or modified. Then flow returns to 606, and another laser beam 112 is received at the first UAV 104A from the off-board laser source 106.

If, on the other hand, the second UAV 104B receives the laser beam 112 from the first UAV 104A, then flow proceeds to 612 and/or 614, depending on the task. At 612, the laser beam 112 is redirected, via the beam deflector 202 of the second UAV 104B, to a third UAV 104C at a different tactical position 108. At 614, the laser beam 112 is redirected, via the beam deflector 202 of the second UAV 104B, to a designated target 116 associated with the task. In one example, the laser beam 112 included embedded information, and the target 116 is represented by a photodetector device such that the photodetector device is able to extract the information embedded within the laser beam 112 upon receipt of the laser beam 112. In another example, the target may be represented by a photovoltaic cell 216, and the laser beam 112 is directed to the photovoltaic cell 216 to convert the energy of the laser beam 112 to electrical energy. In yet another embodiment, the target 116 may be a room or a wall thereof, and the laser beam 112 may be directed to the room for scanning and/or imaging the room.

As described herein, embodiments of the present disclosure provide efficient systems and methods of redirecting laser beams using UAVs without generating the laser beams onboard the UAVs.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

The diagrams of embodiments herein may illustrate one or more control or processing units, such as the vehicle controller 204 shown in FIG. 2. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the vehicle controller 204 may represent processing circuitry such as one or more of a field programmable gate array (FPGA), application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. The vehicle controller 204 shown in FIG. 2 is configured to execute a set of instructions that are stored in one or more storage elements (such as one or more memories), in order to process data. For example, the vehicle controller 204 may include or be coupled to one or more memories. The storage elements may also store data or other information as desired or needed. The storage elements may be in the form of an information source or a physical memory element within a processing machine.

The set of instructions may include various commands that instruct the vehicle controller 204 (FIG. 2) as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An unmanned aerial vehicle (UAV) comprising:
    a housing;
    a beam deflector mounted to the housing; and
    a vehicle controller configured to control an angular orientation of the beam deflector to redirect a laser beam that is received from an off-board laser source.

2. The UAV of claim 1, wherein the housing defines an internal cavity, the beam deflector centrally mounted within the internal cavity relative to a perimeter of the housing.

3. The UAV of claim 1, wherein the beam deflector includes one or more of a beam splitter, a mirror, or a lens.

4. The UAV of claim 1, wherein the beam deflector is configured to one or more of reflect the laser beam or refract the laser beam to redirect the laser beam.

5. The UAV of claim 1, wherein the beam deflector is pivotable along at least one axis of rotation relative to the housing, and the vehicle controller is configured to pivot the beam deflector relative to the housing to control the angular orientation of the beam deflector.

6. The UAV of claim 1, wherein the beam deflector is immovably mounted to the housing and the vehicle controller is configured to control the angular orientation of the beam deflector by modifying an angular orientation of the housing via controlling a propulsion system of the UAV.

7. The UAV of claim 1, wherein the housing defines multiple ports along a perimeter of the housing and the beam deflector is mounted within the housing radially interior of the ports, wherein the laser beam is received into the housing through a first port of the ports and the beam deflector redirects the laser beam out of the housing through a second port of the ports.

8. The UAV of claim 7, wherein the first port includes a lens therein that redirects the laser beam that impinges on the lens towards the beam deflector.

9. The UAV of claim 7, wherein the second port includes a lens therein that receives the laser beam from the beam deflector along a body plane of the housing and redirects the laser beam from the housing along a trajectory out of the body plane of the housing.

10. The UAV of claim 1, further comprising a photodetector mounted within the housing and operatively connected to the vehicle controller, the photodetector configured to monitor the laser beam that is received to extract information embedded within the laser beam.

11. The UAV of claim 1, further comprising a communication circuit operably connected to the vehicle controller, wherein the vehicle controller is configured to control the angular orientation of the beam deflector based on off-board control signals received by the communication circuit.

12. The UAV of claim 1, wherein the vehicle controller is configured to control the angular orientation of the beam deflector relative to at least one of a second UAV or a target object to cause the beam deflector to redirect the laser beam received from the off-board laser source towards the at least one of the second UAV or the target object.

13. A beam redirection system comprising:
    a network of multiple unmanned aerial vehicles (UAVs) disposed at different tactical positions within a working environment, each of the UAVs including a beam deflector,
    wherein the beam deflector of a first UAV of the UAVs is configured to redirect a laser beam received from an off-board laser source towards a second UAV of the UAVs, and the beam deflector of the second UAV is configured to redirect the laser beam received from the first UAV towards at least one of a third UAV or a target.

14. The beam redirection system of claim 13, wherein the tactical position of the first UAV is within a line of sight of the off-board laser source and the tactical position of the second UAV is out of a line of sight of the off-board laser source.

15. The beam redirection system of claim 13, wherein the working environment is a building, wherein the off-board laser source is outside of the building, and the second UAV is within the building.

16. The beam redirection system of claim 13, wherein the beam deflector of the second UAV is configured to redirect the laser beam received from the first UAV towards a wall that represents the target.

17. The beam redirection system of claim 13, wherein the UAVs in the network include photodetectors disposed onboard the UAVs, wherein the photodetectors of the first and second UAVs are configured to monitor the laser beam that is received at each of the first and second UAVs to extract information embedded in the laser beam.

18. The beam redirection system of claim 13, further comprising a remote control system including one or more processors and a communication device, the remote control system configured to transmit control signals, via the communication device, to the UAVs to control the tactical positions of the UAVs and angular orientations of the respective beam deflectors of the UAVs.

19. A method comprising:
    controlling multiple unmanned aerial vehicles (UAVs) to fly to different corresponding tactical positions within a working environment;
    angularly orienting beam deflectors of the UAVs relative to one another;
    receiving a laser beam from an off-board laser source at a first UAV of the UAVs; and redirecting the laser beam, via the beam deflector of the first UAV, to a second UAV of the UAVs.

20. The method of claim 19, further comprising redirecting the laser beam, via the beam deflector of the second UAV, to a third UAV of the UAVs.

21. The method of claim 19, further comprising redirecting the laser beam, via the beam deflector of the second UAV, to a photovoltaic cell.

22. The method of claim 19, further comprising monitoring the laser beam received at the first UAV to extract information embedded within the laser beam.

* * * * *